US012700355B2

(12) United States Patent
Chang et al.

(10) Patent No.: US 12,700,355 B2
(45) Date of Patent: Aug. 4, 2026

(54) LIGHT EMITTING SIGNAL GENERATION CIRCUIT AND SHIFT REGISTER

(71) Applicant: AUO Corporation, Hsinchu City (TW)

(72) Inventors: Che-Chia Chang, Hsinchu City (TW); Che-Wei Tung, Hsinchu City (TW); Mei-Yi Li, Hsinchu City (TW); Yu-Chieh Kuo, Hsinchu City (TW); Yu-Hsun Chiu, Hsinchu City (TW); En-Chih Liu, Hsinchu City (TW); Ming-Hung Chuang, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 19/340,933

(22) Filed: Sep. 26, 2025

(65) Prior Publication Data

US 2026/0162594 A1 Jun. 11, 2026

(30) Foreign Application Priority Data

Dec. 5, 2024 (TW) ................................ 113147308

(51) Int. Cl.
*G09G 3/32* (2016.01)

(52) U.S. Cl.
CPC ....... *G09G 3/32* (2013.01); *G09G 2300/0426* (2013.01); *G09G 2300/0842* (2013.01); *G09G 2310/0286* (2013.01); *G09G 2310/08* (2013.01)

(58) Field of Classification Search
CPC ....... G09G 2310/08; G09G 2310/0286; G09G 2310/0251; G09G 2310/0262; G09G 2310/0267; G09G 2310/0243; G09G 2310/0202; G09G 2310/067; G09G 2310/0224; G09G 2310/0297; G09G 3/3233; G09G 3/3266; G09G 3/3208; G09G 3/20; G09G 3/3225; G09G 3/32; G09G 3/3674; G09G 3/3666; G09G 3/325; G09G 3/2014; G09G 3/3685; G09G 3/3688; G09G 3/3275; G09G 3/3677; G09G 2300/0861; G09G 2300/0426; G09G 2300/0842;
(Continued)

(56) References Cited

U.S. PATENT DOCUMENTS 9,030,399 B2 5/2015 Tseng et al.
2006/0156118 A1* 7/2006 Shin .................... G09G 3/3266 714/726

(Continued)

*Primary Examiner* — Dong Hui Liang
(74) *Attorney, Agent, or Firm* — WPAT, PC

(57) ABSTRACT

A light emitting signal generation circuit is provided and configured to drive a pixel column in a pixel array and includes first, second, and third circuit units. The first circuit unit generates a global light emitting signal based on total clock signals, first and second reference signals. The second circuit unit is coupled to the first circuit unit and generates a first light emitting signal based on the global light emitting signal, the first and second reference signals, and a first clock signal. The first light emitting signal drives first and third sub-pixels of the pixel column. The third circuit unit is coupled to the first circuit unit and generates a second light emitting signal based on the global light emitting signal, the first and second reference signals, and a second clock signal. The second light emitting signal drives a second sub-pixel of the pixel column.

19 Claims, 7 Drawing Sheets

210

(58) Field of Classification Search
CPC ... G09G 2300/0408; G09G 2300/0819; G09G 2320/0233; G09G 2320/0295; G09G 2320/0247; G09G 2320/0209; G09G 2354/00
See application file for complete search history.

(56) References Cited

U.S. PATENT DOCUMENTS

| | | | | |
|---|---|---|---|---|
| 2013/0222357 | A1* | 8/2013 | Tseng | G09G 3/20<br>345/212 |
| 2021/0349599 | A1* | 11/2021 | Chen | G06F 3/04166 |
| 2022/0139304 | A1* | 5/2022 | Ting | G09G 3/32<br>345/55 |
| 2023/0154405 | A1* | 5/2023 | Noh | G09G 3/3233<br>345/204 |

* cited by examiner

LIGHT EMITTING SIGNAL GENERATION CIRCUIT AND SHIFT REGISTER

RELATED APPLICATIONS

This application claims priority to Taiwan Application Serial Number 113147308, filed Dec. 5, 2024, which is herein incorporated by reference.

BACKGROUND

Technical Field

The present disclosure relates to a light emitting signal generation circuit and a shift register.

Description of Prior Art

To drive pixel circuits on a display panel, it is necessary to configure a light emitting signal generation circuit and a scanning signal generation circuit to supply various driving signals to the pixel circuits, thereby controlling light emitting time and brightness of the pixel circuits. However, as the applications of the pixel circuits become more complex, the number of driving signals increases, leading to an increase in the number of pins and wires in the driving circuit. This not only hinders cost reduction but also occupies excessive space within the display device.

SUMMARY

Accordingly, the present disclosure provides a light emitting signal generation circuit. The light emitting signal generation circuit is configured to drive a pixel column in a pixel array and includes a first circuit unit, a second circuit unit, and a third circuit unit. The first circuit unit is configured to generate a global light emitting signal based on global clock signals, a first reference signal, and a second reference signal. The second circuit unit is coupled to the first circuit unit and is configured to generate a first light emitting signal based on the global light emitting signal, the first reference signal, the second reference signal, and a first clock signal. The first light emitting signal is configured to drive a first sub-pixel and a third sub-pixel of the pixel column. The third circuit unit is coupled to the first circuit unit and is configured to generate a second light emitting signal based on the global light emitting signal, the first reference signal, the second reference signal, and a second clock signal. The second light emitting signal is configured to drive a second sub-pixel of the pixel column.

According to one embodiment of the present disclosure, the first circuit unit further includes a coupling circuit. The coupling circuit is configured as an output stage of the first circuit unit and is configured to transmit the first reference signal and the second reference signal to the second circuit unit and the third circuit unit.

According to one embodiment of the present disclosure, the second circuit unit and the third circuit unit are coupled to a first node of the coupling circuit. The coupling circuit includes a first transistor and a second transistor. A first terminal of the first transistor receives the first reference signal, and a second terminal of the first transistor is coupled to the first node, in which the first transistor is turned on to transmit the first reference signal to the first node. A first terminal of the second transistor is coupled to the first node, and a second terminal of the second transistor receives the second reference signal, in which the second transistor is turned on to transmit the second reference signal to the first node.

According to one embodiment of the present disclosure, the second circuit unit includes a third transistor, a fourth transistor, a fifth transistor, and a capacitor. A first terminal of the third transistor is coupled to the first node, and a control terminal of the third transistor receives the first reference signal. A first terminal of the fourth transistor receives the first clock signal, and a control terminal of the fourth transistor is coupled to a second terminal of the third transistor. A first terminal of the fifth transistor is coupled to a second terminal of the fourth transistor, a second terminal of the fifth transistor receives the second reference signal, and a control terminal of the fifth transistor is coupled to a control terminal of the second transistor. A first terminal of the capacitor is coupled to the control terminal of the fourth transistor, and a second terminal of the capacitor is coupled to the first terminal of the fifth transistor and is configured to output the first light emitting signal.

According to one embodiment of the present disclosure, the third circuit unit includes a third transistor, a fourth transistor, a fourth transistor, and a capacitor. A first terminal of the third transistor is coupled to the first node, and a control terminal of the third transistor receives the first reference signal. A first terminal of the fourth transistor receives the second clock signal, and a control terminal of the fourth transistor is coupled to a second terminal of the third transistor. A first terminal of the fifth transistor is coupled to a second terminal of the fourth transistor, a second terminal of the fifth transistor receives the second reference signal, and a control terminal of the fifth transistor is coupled to a control terminal of the second transistor. A first terminal of the capacitor is coupled to the control terminal of the fourth transistor, and a second terminal of the capacitor is coupled to the first terminal of the fifth transistor and is configured to output the second light emitting signal.

According to one embodiment of the present disclosure, the first sub-pixel is a red sub-pixel, the second sub-pixel is a green sub-pixel, and the third sub-pixel is a blue sub-pixel.

The present disclosure provides a light emitting signal generation circuit. The light emitting signal generation circuit is configured to drive a pixel column in a pixel array and includes a first circuit unit, a second circuit unit, a third circuit unit, and a fourth circuit unit. The first circuit unit is configured to generate a global emitting signal based on global clock signals, a first reference signal, and a second reference signal. The second circuit unit is coupled to the first circuit unit and is configured to generate a first light emitting signal based on the global light emitting signal, the first reference signal, the second reference signal, and a first clock signal. The first light emitting signal is configured to drive a first sub-pixel of the pixel column. The third circuit unit is coupled to the first circuit unit and is configured to generate a second light emitting signal based on the global light emitting signal, the first reference signal, the second reference signal, and a second clock signal. The second light emitting signal is configured to drive a second sub-pixel of the pixel column. The fourth circuit unit is coupled to the first circuit unit and is configured to generate a third light emitting signal based on the global light emitting signal, the first reference signal, the second reference signal, and a third clock signal. The third light emitting signal is configured to drive a third sub-pixel of the pixel column.

According to one embodiment of the present disclosure, the first circuit unit further includes a coupling circuit. The coupling circuit is configured as an output stage of the first circuit unit and is configured to transmit the first reference signal and the second reference signal to the second circuit unit, the third circuit unit, and the fourth circuit unit.

According to one embodiment of the present disclosure, the second circuit unit, the third circuit unit and the fourth circuit unit are coupled to a first node of the coupling circuit. The coupling circuit includes a first transistor and a second transistor. A first terminal of the first transistor receives the first reference signal, and a second terminal of the first transistor is coupled to the first node, in which the first transistor is turned on to transmit the first reference signal to the first node. A first terminal of the second transistor is coupled to the first node and a second terminal of the second transistor receives the second reference signal, in which the second transistor is turned on to transmit the second reference signal to the first node.

According to one embodiment of the present disclosure, the second circuit unit includes a third transistor, a fourth transistor, a fifth transistor, and a capacitor. A first terminal of the third transistor is coupled to the first node, and a control terminal of the third transistor receives the first reference signal. A first terminal of the fourth transistor receives the first clock signal, and a control terminal of the fourth transistor is coupled to a second terminal of the third transistor. A first terminal of the fifth transistor is coupled to a second terminal of the fourth transistor, a second terminal of the fifth transistor receives the second reference signal, and a control terminal of the fifth transistor is coupled to a control terminal of the second transistor. A first terminal of the capacitor is coupled to the control terminal of the fourth transistor, and a second terminal of the capacitor is coupled to the first terminal of the fifth transistor and is configured to output the first light emitting signal.

According to one embodiment of the present disclosure, the third circuit unit includes a third transistor, a fourth transistor, a fifth transistor, and a capacitor. A first terminal of the third transistor is coupled to the first node, and a control terminal of the third transistor receives the first reference signal. A first terminal of the fourth transistor receives the second clock signal, and a control terminal of the fourth transistor is coupled to a second terminal of the third transistor. A first terminal of the fifth transistor is coupled to a second terminal of the fourth transistor, a second terminal of the fifth transistor receives the second reference signal, and a control terminal of the fifth transistor is coupled to a control terminal of the second transistor. A first terminal of the capacitor is coupled to the control terminal of the fourth transistor, and a second terminal of the capacitor is coupled to the first terminal of the fifth transistor and is configured to output the second light emitting signal.

According to one embodiment of the present disclosure, the fourth circuit unit includes a third transistor, a fourth transistor, a fifth transistor, and a capacitor. A first terminal of the third transistor is coupled to the first node, and a control terminal of the third transistor receives the first reference signal. A first terminal of the fourth transistor receives the third clock signal, and a control terminal of the fourth transistor is coupled to a second terminal of the third transistor. A first terminal of the fifth transistor is coupled to a second terminal of the fourth transistor, a second terminal of the fifth transistor receives the second reference signal, and a control terminal of the fifth transistor is coupled to a control terminal of the second transistor. A first terminal of the capacitor is coupled to the control terminal of the fourth transistor, and a second terminal of the capacitor is coupled to the first terminal of the fifth transistor and is configured to output the third light emitting signal.

According to one embodiment of the present disclosure, the first sub-pixel is a red sub-pixel, the second sub-pixel is a green sub-pixel, and the third sub-pixel is a blue sub-pixel.

The present disclosure provides a shift register. The shift register includes multiples light emitting signal generation circuits for each generating and sequentially transmitting a global light emitting signal to sequentially drive a plurality of pixel columns in a pixel array. Each of the light emitting signal generation circuits includes a first circuit unit, a first circuit unit, and a third circuit unit. The first circuit unit is configured to generate a global emitting signal based on global clock signals, a first reference signal, and a second reference signal. The second circuit unit is coupled to the first circuit unit and is configured to generate a first light emitting signal based on the global light emitting signal, the first reference signal, the second reference signal, and a first clock signal. The first light emitting signal is configured to drive a first sub-pixel and a third sub-pixel of the pixel column. The third circuit unit is coupled to the first circuit unit and is configured to generate a second light emitting signal based on the global light emitting signal, the first reference signal, the second reference signal, and a second clock signal. The second light emitting signal is configured to drive a second sub-pixel of the pixel column.

According to one embodiment of the present disclosure, the first circuit unit further includes a coupling circuit. The coupling circuit is configured as an output stage of the first circuit unit and is configured to transmit the first reference signal and the second reference signal to the second circuit unit and the third circuit unit.

According to one embodiment of the present disclosure, the second circuit unit and the third circuit unit are coupled to a first node of the coupling circuit. The coupling circuit includes a first transistor and a second transistor. A first terminal of the first transistor receives the first reference signal, and a second terminal of the first transistor is coupled to the first node, in which the first transistor is turned on to transmit the first reference signal to the first node. A first terminal of the second transistor is coupled to the first node and a second terminal of the second transistor receives the second reference signal, in which the second transistor is turned on to transmit the second reference signal to the first node.

According to one embodiment of the present disclosure, the second circuit unit includes a third transistor, a fourth transistor, a fifth transistor, and a capacitor. A first terminal of the third transistor is coupled to the first node, and a control terminal of the third transistor receives the first reference signal. A first terminal of the fourth transistor receives the first clock signal, and a control terminal of the fourth transistor is coupled to a second terminal of the third transistor. A first terminal of the fifth transistor is coupled to a second terminal of the fourth transistor, a second terminal of the fifth transistor receives the second reference signal, and a control terminal of the fifth transistor is coupled to a control terminal of the second transistor. A first terminal of the capacitor is coupled to the control terminal of the fourth transistor, and a second terminal of the capacitor is coupled to the first terminal of the fifth transistor and is configured to output the first light emitting signal.

According to one embodiment of the present disclosure, the third circuit unit includes a third transistor, a fourth transistor, a fourth transistor, and a capacitor. A first terminal of the third transistor is coupled to the first node, and a control terminal of the third transistor receives the first reference signal. A first terminal of the fourth transistor receives the second clock signal, and a control terminal of the fourth transistor is coupled to a second terminal of the third transistor. A first terminal of the fifth transistor is coupled to a second terminal of the fourth transistor, a second terminal of the fifth transistor receives the second reference signal, and a control terminal of the fifth transistor is coupled to a control terminal of the second transistor. A first terminal of the capacitor is coupled to the control terminal of the fourth transistor, and a second terminal of the capacitor is coupled to the first terminal of the fifth transistor and is configured to output the second light emitting signal.

According to one embodiment of the present disclosure, the first sub-pixel is a red sub-pixel, the second sub-pixel is a green sub-pixel, and the third sub-pixel is a blue sub-pixel.

BRIEF DESCRIPTION OF THE DRAWINGS

For a clearer and easier understanding of the above and other objects, features, advantages, and embodiments of the present disclosure, the drawings are described below.

DETAILED DESCRIPTION

Figure 1:
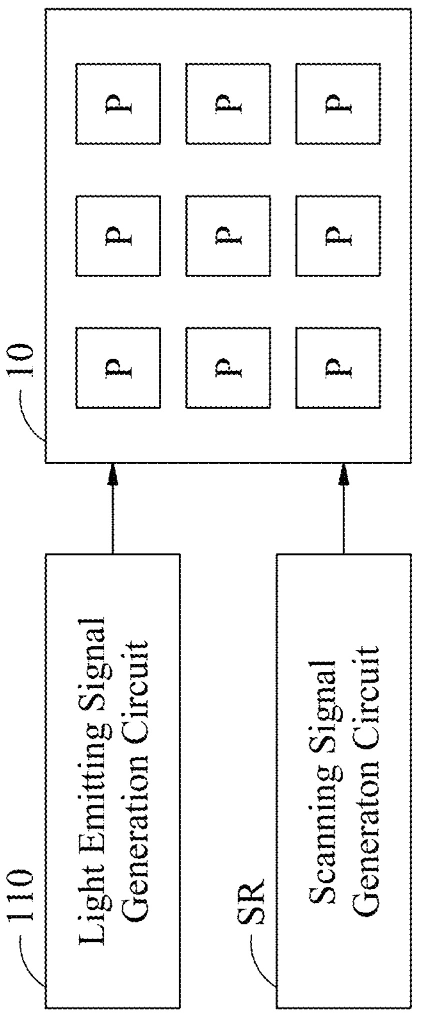
FIG. 1 is a schematic diagram of the structure of a pixel circuit, a light emitting signal generation circuit, and a scanning signal generation circuit according to an embodiment of the present disclosure.

Various embodiments or examples are provided below for implementing various features of the present disclosure. The embodiments of components and configurations described below are examples only and are not intended to be restrictive. In addition, for the purpose of simplification and clarity, the present disclosure repeats reference numerals and/or numbers in each example in the present disclosure, and this repetition does not in itself limit the relationship between various embodiments and/or components discussed.

Referring to FIG. 1, FIG. 1 is a schematic diagram of the structure of pixel circuits P, a light emitting signal generation circuit 110, and a scanning signal generation circuit SR according to an embodiment of the present disclosure. The light emitting signal generation circuit 110 and the scanning signal generation circuit SR are coupled to the pixel circuits P in the pixel array 10 of a display panel (not depicted) and are configured to provide various driving signals required by the pixel circuits P in a time-shared manner. In the embodiments of the present disclosure, the driving signals include but are not limited to scanning signal RS[n], data writing signal WS[n], and light emitting signal EM[n], which may be used to control the transistors and the capacitors in the pixel circuits P, thereby controlling luminous time and luminous intensity of the light emitting elements (e.g., light emitting diodes) in the pixel circuits P.

In the embodiments of the present disclosure, each column of the pixel array 10 includes multiple pixel circuits P, and each of the pixel circuits P may represent one of a first sub-pixel (e.g., a red sub-pixel), a second sub-pixel (e.g., a green sub-pixel), and a third sub-pixel (e.g., a blue sub-pixel).

Figure 2:
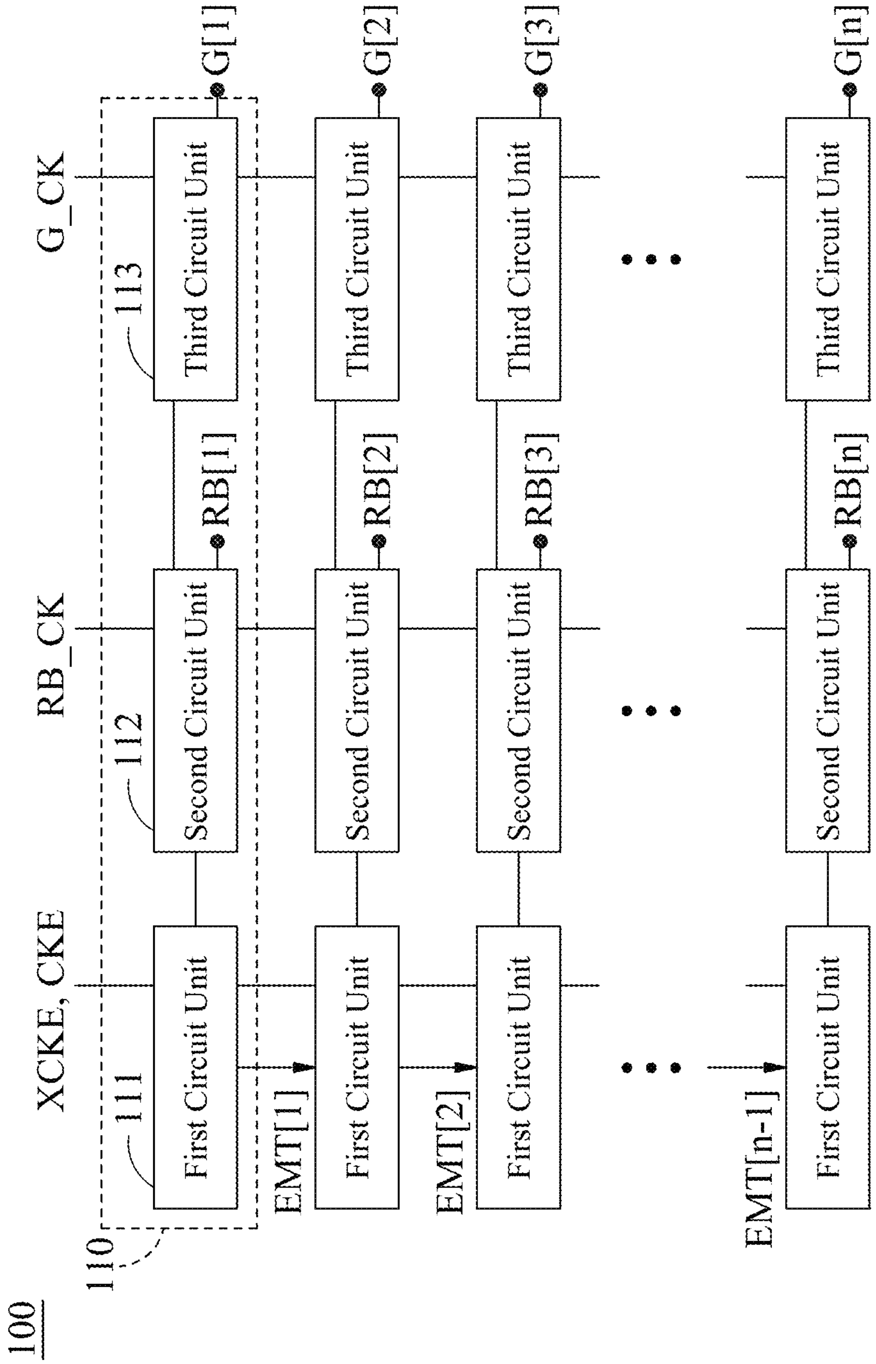
FIG. 2 is a schematic diagram of a shift register according to an embodiment of the present disclosure.

Referring to FIG. 2, FIG. 2 is a schematic diagram of a shift register 100 according to an embodiment of the present disclosure. The shift register 100 includes multiple stages of light emitting signal generation circuits 110, and each light emitting signal generation circuit 110 includes a first circuit unit 111, a second circuit unit 112, and a third circuit unit 113 for sequentially driving corresponding pixel columns on the display panel. For the sake of simplicity, only one light emitting signal generation circuit 110 is framed, and their internal circuits are marked with the symbols in FIG. 2.

Taking the first-stage light emitting signal generation circuit 110 as an example, the first circuit unit 111 generates a global light emitting signal EMT[1] based on global clock signals XCKE and CKE, a first reference signal VGL, and a second reference signal VGH (not shown in FIG. 2). The global light emitting signal EMT[1] further controls a cascaded second circuit unit 112 and third circuit unit 113 to generate a first light emitting signal RB[1] and a second light emitting signal G[1], respectively, which are transmitted to the corresponding pixel circuits P in the first pixel column. The global light emitting signal EMT[1] generated by the first-stage light emitting signal generation circuit 110 is also transmitted to the second-stage light emitting signal generation circuit 110 to trigger its subsequent operation. Similarly, the pixel circuits P from the first column to the nth column are sequentially driven by the first light emitting signals RB[1]~RB[n] and the second light emitting signals G[1]~G[n].

Specifically, the second circuit unit 112 and the third circuit unit 113 are coupled to the first circuit unit 111. The second circuit unit 112 generates the first light emitting signal RB[1] based on the global light emitting signal EMT[1] generated by the first circuit unit 111, the first reference signal VGL, the second reference signal VGH, and a first clock signal RB_CK. The third circuit unit 113 generates the second light emitting signal G[1] based on the global light emitting signal EMT[1] generated by the first circuit unit 111, the first reference signal VGL, the second reference signal VGH, and a second clock signal G_CK.

In the embodiment of the present disclosure, each pixel circuit P in the first pixel columns receives either the first light emitting signal RB[1] supplied by the second circuit unit 112 or the second light emitting signal G[1] supplied by the third circuit unit 113, depending on the color sub-pixel it represents. In the example shown in FIG. 2, the pixel circuits P serving as red sub-pixels and the pixel circuits P serving as blue sub-pixels share the same light emitting signal, namely the first light emitting signal RB[1] supplied by the second circuit unit 112. The pixel circuits P serving as green sub-pixels independently use another light emitting signal, namely the second light emitting signal G[1] supplied by the third circuit unit 113.

Specifically, each light emitting signal generation circuit 110 drives the second circuit unit 112 and the third circuit unit 113 through a single first circuit unit 111, which allows the specific color sub-pixels to be controlled independently. As a result, the red sub-pixels, blue sub-pixels, and green sub-pixels may have individually optimized light emitting times, thereby improving overall efficiency. Compared to a one-to-one circuit unit driving structure for providing light emitting signals, this one-to-multiple circuit unit driving structure may effectively reduce the number of pins and wires required for the driving signals.

Figure 3:
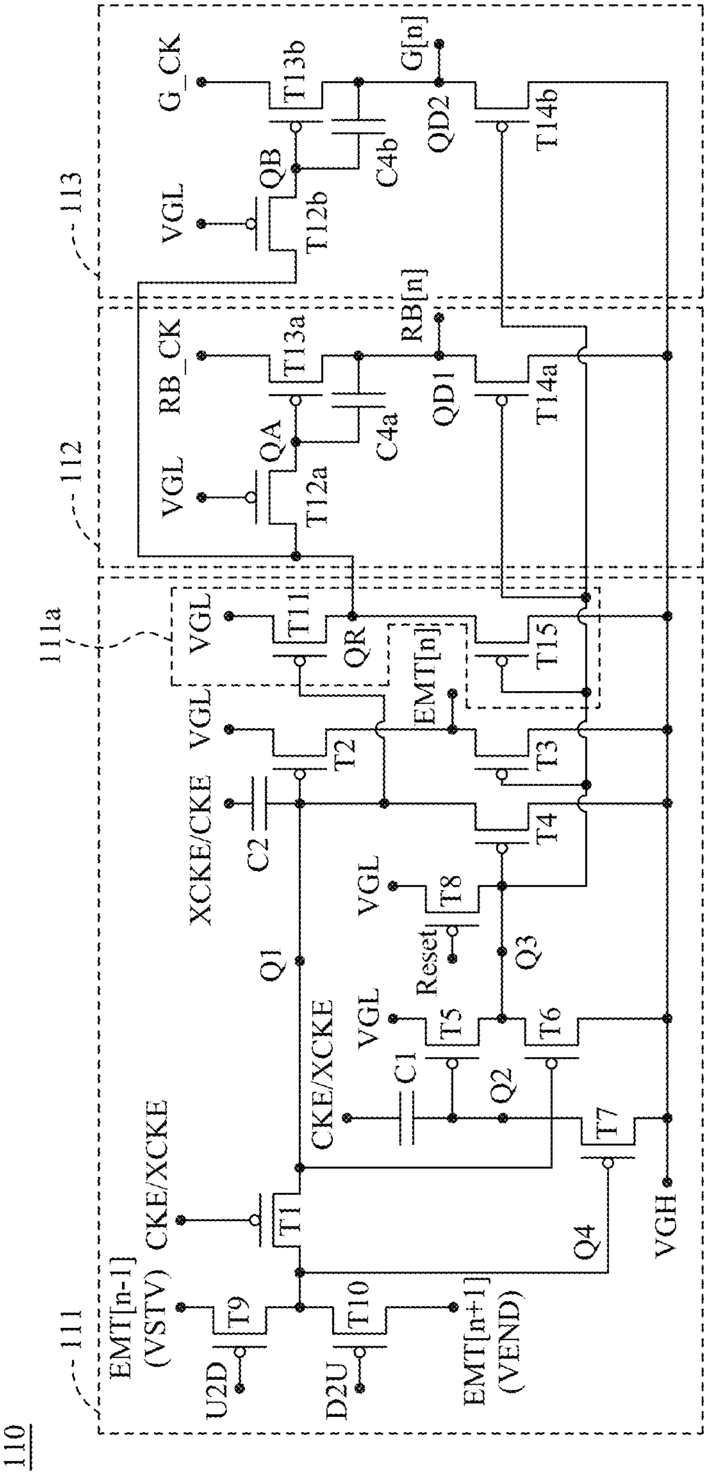
FIG. 3 is a schematic diagram of a light emitting signal generation circuit according to an embodiment of the present disclosure.

Referring to FIG. 3, FIG. 3 is a schematic diagram of the light emitting signal generation circuit 110 according to an embodiment of the present disclosure, showing the structure of internal circuits of the first circuit unit 111, the second circuit unit 112, and the third circuit unit 113.

The first circuit unit 111 includes transistors T1~T11, transistor T15, and capacitors C1 and C2. A first terminal of the transistor T9 receives the global light emitting signal EMT[n−1] (or a start signal VSTV) from the previous stage, and a second terminal of the transistor T9 is coupled to a first terminal of the transistor T10. A second terminal of the transistor T10 receives the global light emitting signal EMT[n+1] (or an end signal VEND) from the next stage. The control terminals of the transistors T9 and T10 respectively receive selection signals U2D and D2U. The selection signals U2D and D2U are used to set the scanning directions among the multiple stages of light emitting signal generation circuits 110 in the display panel. When the selection signal U2D is at a low logic level, the global light emitting signal EMT[n−1] from the previous stage is transmitted to a node Q4. When the selection signal D2U is at a low logic level, the global light emitting signal EMT[n+1] from the next stage is transmitted to the node Q4.

It should be understood that in the application where the first circuit unit 111 includes the selection signals U2D and D2U, the global light emitting signals EMT[1] to EMT[n−1] between each stage of the light emitting signal generation circuits 110 (as shown in FIG. 2) may also be propagated in the reverse direction. This enables the cascaded second circuit unit 112 and third circuit unit 113 to generate corresponding light emitting signals during normal operation.

Please continue referring to FIG. 3. The first circuit unit 111 receives several global clock signals (e.g., global clock signals CKE and XCKE), the first reference signal VGL and the second reference signal VGH, and the node Q4 receives either a previous-stage global light emitting signal EMT[n−1] or a next-stage global light emitting signal EMT[n+1]. Based on these signals, the first circuit unit 111 outputs the global light emitting signal EMT[n] at a node between the transistor T2 and the transistor T3.

The transistors T11 and T15 serve as the output stage of the first circuit unit 111 and are configured as a coupling circuit 111*a* to transmit the first reference signal VGL and the second reference signal VGH to the second circuit unit 112 and the third circuit unit 113. The second circuit unit 112 generates the first light emitting signal RB[1] at its output based on the global light emitting signal EMT[n], the first reference signal VGL, the second reference signal VGH, and the first clock signal RB_CK. Similarly, the third circuit unit 113 generates the second light emitting signal G[1] based on the global light emitting signal EMT[n], the first reference signal VGL, the second reference signal VGH, and the second clock signal G_CK.

Specifically, the second circuit unit 112 and the third circuit unit 113 are coupled to the node QR of the coupling circuit 111*a*. A first terminal of the transistor T11 is configured to receive the first reference signal VGL, a second terminal of the transistor T11 is connected to the node QR, and a control terminal of the transistor T11 is coupled to the node Q1. The transistor T11 is turned on or off based on the control signal received at the node Q1, and transmits the first reference signal VGL to the node QR when turned on. A first terminal of the transistor T15 is connected to the node QR, the second terminal of the transistor T15 is configured to receive the second reference signal VGH, and the control terminal of the transistor T15 is coupled to the node Q3. The transistor T15 is turned on or off based on the control signal received at the node Q3, and transmits the second reference signal VGH to the node QR when turned on.

Each of the second circuit unit 112 and the third circuit unit 113 includes multiple transistors and one capacitor. The second circuit unit 112 includes a capacitor C4*a* and transistors T12*a*~T14*a*, and the third circuit unit 113 includes a capacitor C4*b* and transistors T12*b*~T14*b*.

A first terminal of the transistor T12*a* is coupled to the node QR, and a control terminal of the transistor T12*a* receives the first reference signal VGL. A first terminal of the transistor T13*a* receives the first clock signal RB_CK, and a control terminal of the transistor T13*a* is coupled to a second terminal of the transistor T12*a* at the node QA. A first terminal of the transistor T14*a* is coupled to the second terminal of transistor T13*a* at the node QD1, and a second terminal of the transistor T14*a* receives the second reference signal VGH. A first terminal of the capacitor C4*a* is coupled to the node QA, and the second terminal of the capacitor C4*a* is coupled to the node QD1 to output the first light emitting signal RB[n], thereby driving the pixel circuits P corresponding to the red sub-pixels and the blue sub-pixels in the nth column.

A first terminal of transistor T12*b* is coupled to the node QR, and a control terminal of transistor T12*b* receives the first reference signal VGL. A first terminal of the transistor T13*b* receives the second clock signal G_CK, and the control terminal of the transistor T13*b* is coupled to the second terminal of the transistor T12*b* at the node QB. A first terminal of the transistor T14*b* is coupled to the second terminal of the transistor T13*b* at the node QD2, and the second terminal of the transistor T14*b* receives the second reference signal VGH. A first terminal of the capacitor C4*b* is coupled to the node QB, and the second terminal of the capacitor C4*b* is coupled to the node QD2 to output the second light emitting signal G[n], thereby driving the pixel circuits P corresponding to the green sub-pixels in the nth column.

Figure 4:
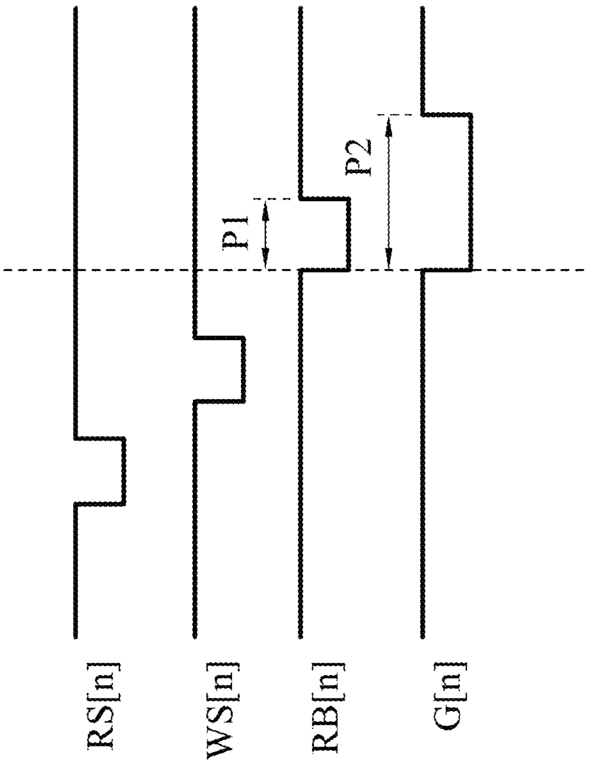
FIG. 4 is a timing diagram of driving signals for pixel circuits according to an embodiment of the present disclosure.

Referring to FIG. 4, FIG. 4 is a timing diagram of the driving signals for the pixel circuits P according to an embodiment of the present disclosure, in which the depicted driving signals include scanning signal RS[n], data writing signal WS[n], first light emitting signal RB[n], and second light emitting signal G[n].

The scanning signal RS[n] and the data writing signal WS[n] are provided by the scanning signal generation circuit SR shown in FIG. 1, while the first light emitting signal RB[n] and the second light emitting signal G[n] are provided by the light emitting signal generation circuit 110 of the present disclosure. It can be observed that, since the first light emitting signal RB[n] supplied to the red sub-pixels and blue sub-pixels is relatively independent from the second light emitting signal G[n] supplied to the green sub-pixels, the light emitting time P2 (also referred to as the duty cycle) of the pixel circuits P corresponding to the green sub-pixels may be independently controlled.

According to actual application needs, any two colors among the red sub-pixels, the blue sub-pixels, and the green sub-pixels may be controlled by the same light emitting signal, while the remaining one color is independently controlled by another light emitting signal. This configuration not only improves overall light emitting efficiency, but also minimizes the number of pins and wirings.

Figure 5:
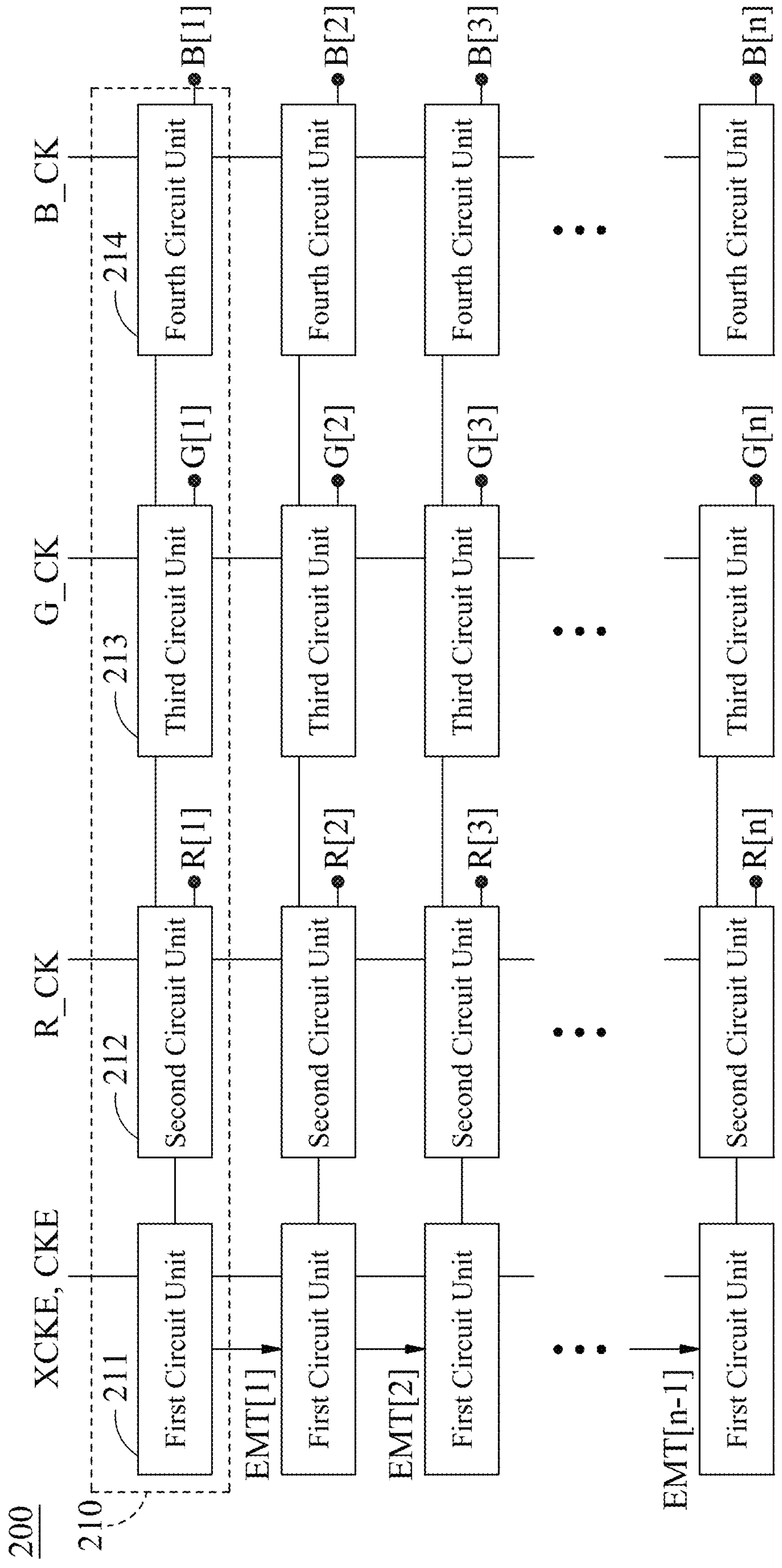
FIG. 5 is a schematic diagram of a shift register according to another embodiment of the present disclosure.

Referring to FIG. 5, FIG. 5 is a schematic diagram of a shift register 200 according to another embodiment of the present disclosure. The shift register 200 includes multiple stages of light emitting signal generation circuits 210, each of which includes a first circuit unit 211, a second circuit unit 212, a third circuit unit 213, and a fourth circuit unit 214 for sequentially driving the corresponding pixel columns on the display panel.

Compared to the shift register 100 shown in FIG. 2, the difference lies in that the pixel circuits P corresponding to the red sub-pixels, the blue sub-pixels, and green sub-pixels are independently controlled by the second circuit unit 212, the third circuit unit 213, and the fourth circuit unit 214, respectively, through the first light emitting signal R[n], the second light emitting signal G[n], and the third light emitting signal B[n]. In such embodiment, the light emitting time of each color sub-pixel may be independently adjusted to achieve optimal overall light emitting efficiency. The light emitting signal generation circuit 210 adopts the same one-to-multiple circuit unit driving structure as the light emitting signal generation circuit 110 in FIG. 1, which effectively reduces the number of required pins and wires for the driving signals.

Figure 6:
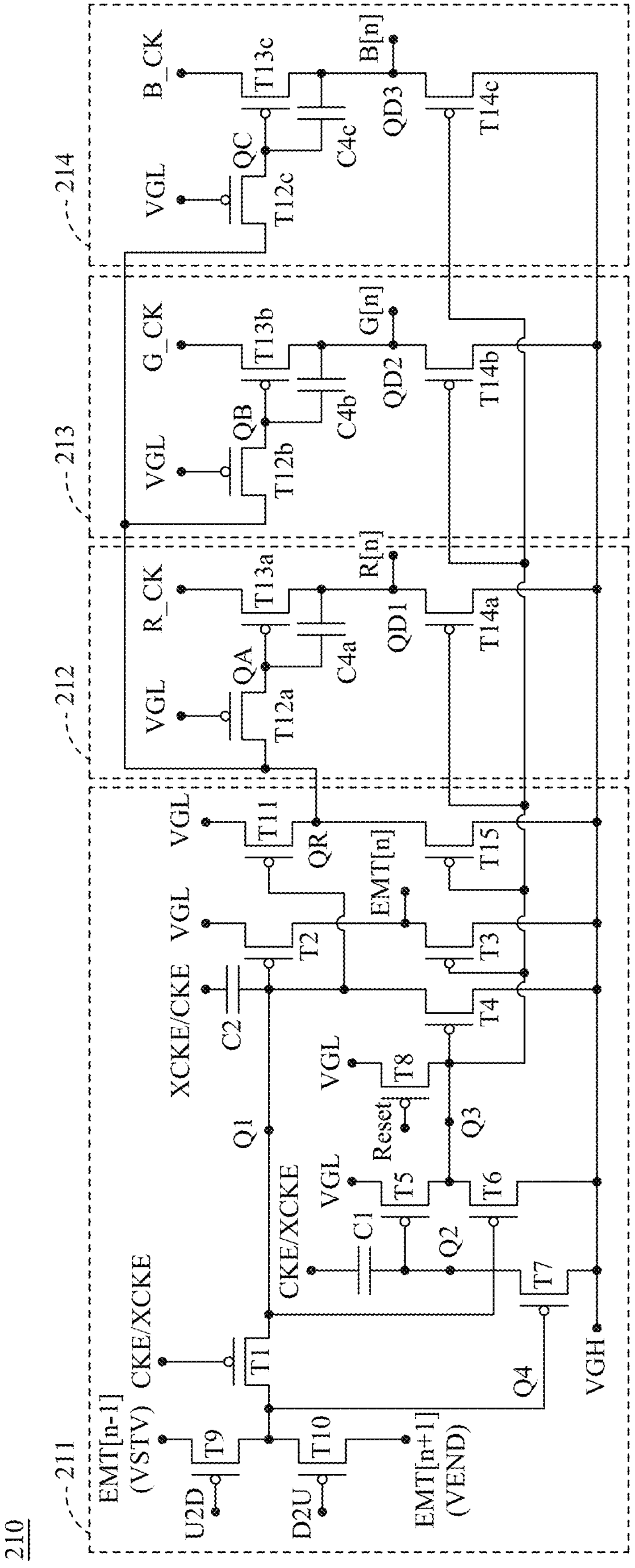
FIG. 6 is a schematic diagram of a light emitting signal generation circuit according to another embodiment of the present disclosure.

Referring to FIG. 6, FIG. 6 is a schematic diagram of the light emitting signal generation circuit 210 according to another embodiment of the present disclosure, illustrating structure of internal circuits of the first circuit unit 211, the second circuit unit 212, the third circuit unit 213, and the fourth circuit unit 214. Since the operation and structure of the light emitting signal generation circuit 210 are similar to those of the light emitting signal generation circuit 110, and the additional fourth circuit unit 214 is also similar to the first circuit unit 211, the second circuit unit 212, and the third circuit unit 213, detailed descriptions are omitted herein.

Figure 7:
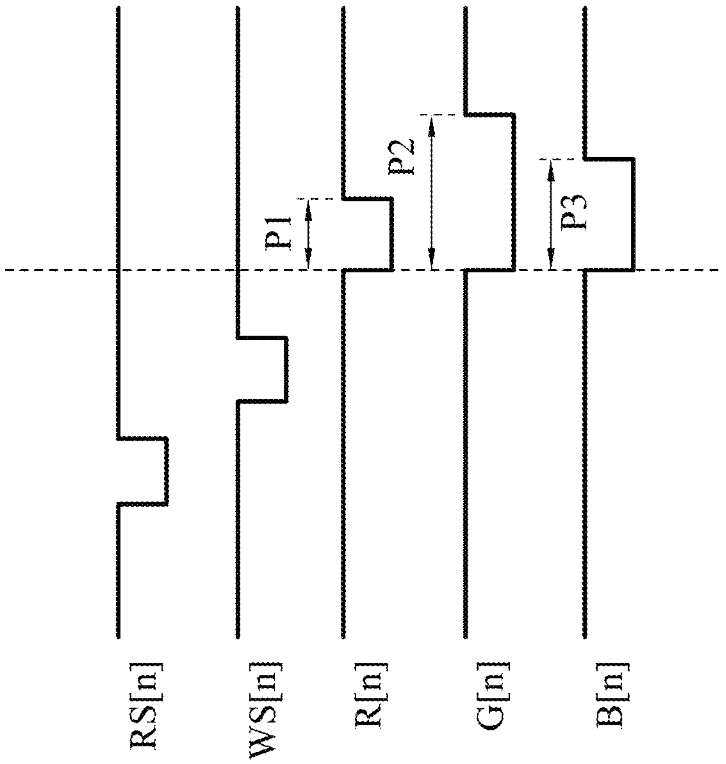
FIG. 7 is a timing diagram of driving signals for pixel circuits according to another embodiment of the present disclosure.

Referring to FIG. 7, FIG. 7 is a timing diagram of the driving signals for the pixel circuits P according to another embodiment of the present disclosure, in which the depicted driving signals include scanning signal RS[n], data writing signal WS[n], first light emitting signal R[n], second light emitting signal G[n], and third light emitting signal B[n]. The scanning signal RS[n] and the data writing signal WS[n] are provided by the scanning signal generation circuit SR shown in FIG. 1, while the first light emitting signal R[n], the second light emitting signal G[n], and the third light emitting signal B[n] are provided by the light emitting signal generation circuit 210 of the present disclosure.

It can be observed that, since the first light emitting signal R[n], the second light emitting signal G[n], and the third light emitting signal B[n] supplied to the red sub-pixels, blue sub-pixels, and green sub-pixels, respectively, are all independent light emitting signals, the light emitting times P1, P2, and P3 for each color sub-pixel may be independently controlled. This configuration not only optimizes light emitting efficiency, but also reduces the number of required pins and wires.

In summary, the shift register and the light emitting signal generation circuit of the present disclosure supply light emitting signals to each pixel column through a one-to-multiple circuit unit driving structure. The one-to-multiple circuit unit driving structure not only effectively reduces the number of required pins and wires for driving signals, but also enables independent control of the specific color sub-pixels requiring enhanced regulation. As a result, the overall light emitting efficiency can be improved.

Although the present disclosure has been disclosed as above in embodiments, the embodiments are not intended to limit the present disclosure, and those of ordinary skill in the art may make some changes and embellishments within the spirit and scope of the present disclosure, therefore, the scope of protection of the present disclosure shall be defined in the attached claims.

What is claimed is:

1. A light emitting signal generation circuit for driving a pixel column in a pixel array, comprising:

a first circuit unit, configured to generate a global light emitting signal based on a plurality of global clock signals, a first reference signal, and a second reference signal;

a second circuit unit, coupled to the first circuit unit, and configured to generate a first light emitting signal based on the global light emitting signal, the first reference signal, the second reference signal, and a first clock signal, wherein the first light emitting signal is configured to drive a first sub-pixel of the pixel column; and a third circuit unit, coupled to the first circuit unit, and configured to generate a second light emitting signal based on the global light emitting signal, the first reference signal, the second reference signal, and a second clock signal, wherein the second light emitting signal is configured to drive a second sub-pixel of the pixel column; and a fourth circuit unit, coupled to the first circuit unit, and configured to generate a third light emitting signal based on the global light emitting signal, the first reference signal, the second reference signal, and a third clock signal, wherein the third light emitting signal is configured to drive a third sub-pixel of the pixel column.

2. The light emitting signal generation circuit of claim 1, wherein the first circuit unit further comprises:

a coupling circuit, configured as an output stage of the first circuit unit and configured to transmit the first reference signal and the second reference signal to the second circuit unit, the third circuit unit, and the fourth circuit unit.

3. The light emitting signal generation circuit of claim 2, wherein the second circuit unit, the third circuit unit and the fourth circuit unit are coupled to a first node of the coupling circuit, the coupling circuit comprises:

a first transistor, a first terminal of the first transistor receives the first reference signal, and a second terminal of the first transistor is coupled to the first node, wherein the first transistor is turned on to transmit the first reference signal to the first node; and a second transistor, a first terminal of the second transistor is coupled to the first node, and a second terminal of the second transistor receives the second reference signal, wherein the second transistor is turned on to transmit the second reference signal to the first node.

4. The light emitting signal generation circuit of claim 3, wherein the second circuit unit comprises:

a third transistor, wherein a first terminal of the third transistor is coupled to the first node, and a control terminal of the third transistor receives the first reference signal;

a fourth transistor, wherein a first terminal of the fourth transistor receives the first clock signal, and a control terminal of the fourth transistor is coupled to a second terminal of the third transistor;

a fifth transistor, wherein a first terminal of the fifth transistor is coupled to a second terminal of the fourth transistor, a second terminal of the fifth transistor receives the second reference signal, and a control terminal of the fifth transistor is coupled to a control terminal of the second transistor; and a capacitor, wherein a first terminal of the capacitor is coupled to the control terminal of the fourth transistor, and a second terminal of the capacitor is coupled to the first terminal of the fifth transistor and is configured to output the first light emitting signal.

5. The light emitting signal generation circuit of claim 3, wherein the third circuit unit comprises:

a third transistor, wherein a first terminal of the third transistor is coupled to the first node, and a control terminal of the third transistor receives the first reference signal;

a fourth transistor, wherein a first terminal of the fourth transistor receives the second clock signal, and a control terminal of the fourth transistor is coupled to a second terminal of the third transistor;

a fifth transistor, wherein a first terminal of the fifth transistor is coupled to a second terminal of the fourth transistor, a second terminal of the fifth transistor receives the second reference signal, and a control terminal of the fifth transistor is coupled to a control terminal of the second transistor; and a capacitor, wherein a first terminal of the capacitor is coupled to the control terminal of the fourth transistor, and a second terminal of the capacitor is coupled to the first terminal of the fifth transistor and is configured to output the second light emitting signal.

6. The light emitting signal generation circuit of claim 3, wherein the fourth circuit unit comprises:

a third transistor, wherein a first terminal of the third transistor is coupled to the first node, and a control terminal of the third transistor receives the first reference signal;

a fourth transistor, wherein a first terminal of the fourth transistor receives the third clock signal, and a control terminal of the fourth transistor is coupled to a second terminal of the third transistor;

a fifth transistor, wherein a first terminal of the fifth transistor is coupled to a second terminal of the fourth transistor, a second terminal of the fifth transistor receives the second reference signal, and a control terminal of the fifth transistor is coupled to a control terminal of the second transistor; and a capacitor, wherein a first terminal of the capacitor is coupled to the control terminal of the fourth transistor, and a second terminal of the capacitor is coupled to the first terminal of the fifth transistor and is configured to output the third light emitting signal.

7. The light emitting signal generation circuit of claim 1, wherein the first sub-pixel is a red sub-pixel, the second sub-pixel is a green sub-pixel, and the third sub-pixel is a blue sub-pixel.

8. A light emitting signal generation circuit for driving a pixel column in a pixel array, comprising:

a first circuit unit configured to generate a global light emitting signal based on a plurality of global clock signals, a first reference signal, and a second reference signal;

a second circuit unit coupled to the first circuit unit and configured to generate a first light emitting signal based on the global light emitting signal, the first reference signal, the second reference signal, and a first clock signal, wherein the first light emitting signal is configured to drive a first sub-pixel and a third sub-pixel of the pixel column; and a third circuit unit coupled to the first circuit unit, and configured to generate a second light emitting signal based on the global light emitting signal, the first reference signal, the second reference signal, and a second clock signal, wherein the second light emitting signal is configured to drive a second sub-pixel of the pixel column.

9. The light emitting signal generation circuit of claim 8, wherein the first circuit unit further comprises:

a coupling circuit configured as an output stage of the first circuit unit and configured to transmit the first reference signal and the second reference signal to the second circuit unit and the third circuit unit.

10. The light emitting signal generation circuit of claim 9, wherein the second circuit unit and the third circuit unit are coupled to a first node of the coupling circuit, the coupling circuit comprises:

a first transistor, wherein a first terminal of the first transistor receives the first reference signal, and a second terminal of the first transistor is coupled to the first node, wherein the first transistor is turned on to transmit the first reference signal to the first node; and a second transistor, wherein a first terminal of the second transistor is coupled to the first node, and a second terminal of the second transistor receives the second reference signal, wherein the second transistor is turned on to transmit the second reference signal to the first node.

11. The light emitting signal generation circuit of claim 10, wherein the second circuit unit comprises:

a third transistor, wherein a first terminal of the third transistor is coupled to the first node, and a control terminal of the third transistor receives the first reference signal;

a fourth transistor, wherein a first terminal of the fourth transistor receives the first clock signal, and a control terminal of the fourth transistor is coupled to a second terminal of the third transistor;

a fifth transistor, wherein a first terminal of the fifth transistor is coupled to a second terminal of the fourth transistor, a second terminal of the fifth transistor receives the second reference signal, and a control terminal of the fifth transistor is coupled to a control terminal of the second transistor; and a capacitor, wherein a first terminal of the capacitor is coupled to the control terminal of the fourth transistor, and a second terminal of the capacitor is coupled to the first terminal of the fifth transistor and is configured to output the first light emitting signal.

12. The light emitting signal generation circuit of claim 10, wherein the third circuit unit comprises:

a third transistor, wherein a first terminal of the third transistor is coupled to the first node, and a control terminal of the third transistor receives the first reference signal;

a fourth transistor, wherein a first terminal of the fourth transistor receives the second clock signal, and a control terminal of the fourth transistor is coupled to a second terminal of the third transistor;

a fifth transistor, wherein a first terminal of the fifth transistor is coupled to a second terminal of the fourth transistor, a second terminal of the fifth transistor receives the second reference signal, and a control terminal of the fifth transistor is coupled to a control terminal of the second transistor; and a capacitor, wherein a first terminal of the capacitor is coupled to the control terminal of the fourth transistor, and a second terminal of the capacitor is coupled to the first terminal of the fifth transistor and is configured to output the second light emitting signal.

13. The light emitting signal generation circuit of claim 8, wherein the first sub-pixel is a red sub-pixel, the second sub-pixel is a green sub-pixel, and the third sub-pixel is a blue sub-pixel.

14. A shift register, comprising:

a plurality of light emitting signal generation circuits for each generating and sequentially transmitting a global light emitting signal to sequentially drive a plurality of pixel columns in a pixel array, and each of the light emitting signal generation circuits comprises:

a first circuit unit configured to generate the global light emitting signal based on a plurality of global clock signals, a first reference signal, and a second reference signal;

a second circuit unit coupled to the first circuit unit and configured to generate a first light emitting signal based on the global light emitting signal, the first reference signal, the second reference signal, and a first clock signal, wherein the first light emitting signal is configured to drive a first sub-pixel and a third sub-pixel of a corresponding one of the pixel columns; and a third circuit unit coupled to the first circuit unit and configured to generate a second light emitting signal based on the global light emitting signal, the first reference signal, the second reference signal, and a second clock signal, wherein the second light emitting signal is configured to drive a second sub-pixel of the corresponding one of the pixel columns.

15. The shift register of claim 14, wherein the first circuit unit further comprises:

a coupling circuit, configured as an output stage of the first circuit unit and configured to transmit the first reference signal and the second reference signal to the second circuit unit and the third circuit unit.

16. The shift register of claim 15, wherein the second circuit unit and the third circuit unit are coupled to a first node of the coupling circuit, the coupling circuit comprises:

a first transistor, wherein a first terminal of the first transistor receives the first reference signal, and a second terminal of the first transistor is coupled to the first node, wherein the first transistor is turned on to transmit the first reference signal to the first node; and a second transistor, wherein a first terminal of the second transistor is coupled to the first node, and a second terminal of the second transistor receives the second reference signal, wherein the second transistor is turned on to transmit the second reference signal to the first node.

17. The shift register of claim 16, wherein the second circuit unit comprises:

a third transistor, wherein a first terminal of the third transistor is coupled to the first node, and a control terminal of the third transistor receives the first reference signal;

a fourth transistor, wherein a first terminal of the fourth transistor receives the first clock signal, and a control terminal of the fourth transistor is coupled to a second terminal of the third transistor;

a fifth transistor, wherein a first terminal of the fifth transistor is coupled to a second terminal of the fourth transistor, a second terminal of the fifth transistor receives the second reference signal, and a control terminal of the fifth transistor is coupled to a control terminal of the second transistor; and a capacitor, wherein a first terminal of the capacitor is coupled to the control terminal of the fourth transistor, and a second terminal of the capacitor is coupled to the first terminal of the fifth transistor and is configured to output the first light emitting signal.

18. The shift register of claim 16, wherein the second circuit unit comprises:

a third transistor, wherein a first terminal of the third transistor is coupled to the first node, and a control terminal of the third transistor receives the first reference signal;

a fourth transistor, wherein a first terminal of the fourth transistor receives the second clock signal, and a control terminal of the fourth transistor is coupled to a second terminal of the third transistor;

a fifth transistor, wherein a first terminal of the fifth transistor is coupled to a second terminal of the fourth transistor, a second terminal of the fifth transistor receives the second reference signal, and a control terminal of the fifth transistor is coupled to a control terminal of the second transistor; and a capacitor, wherein a first terminal of the capacitor is coupled to the control terminal of the fourth transistor, and a second terminal of the capacitor is coupled to the first terminal of the fifth transistor and is configured to output the second light emitting signal.

19. The shift register of claim 14, wherein the first sub-pixel is a red sub-pixel, the second sub-pixel is a green sub-pixel, and the third sub-pixel is a blue sub-pixel.

* * * * *